United States Patent

[11] 3,577,768

[72] Inventors Theophil Aprill, Jr.;
John R. Leerkamp, Ann Arbor, Mich.
[21] Appl. No. 854,614
[22] Filed Sept. 2, 1969
[45] Patented May 4, 1971
[73] Assignee A & L Battery & Electric Service, Inc.
Ann Arbor, Mich.

[54] HYDROSTATIC TESTING APPARATUS
14 Claims, 4 Drawing Figs.
[52] U.S. Cl. ......................................... 73/40.5R
[51] Int. Cl. .......................................... G01m 3/26
[50] Field of Search ........................... 73/40, 40.5, 37, 168, 4

[56] References Cited
UNITED STATES PATENTS
3,100,986 8/1963 Starr et al. ................... 73/40

3,418,843 12/1968 Bosshart ...................... 73/37

*Primary Examiner*—Louis R. Prince
*Assistant Examiner*—William A. Henry, II
*Attorney*—Olsen and Stephenson ABSTRACT: Portable apparatus for hydrostatically testing hydraulic equipment such as hydraulic-electric and air-over-oil car, truck and bus lifts, hydraulic dock leveling devices, hydraulic docks, and the like, to ensure its safe functioning and for preventative maintenance. The apparatus includes a reservoir for hydraulic fluid, supply means for supplying hydraulic fluid under pressure to the equipment being tested, a pressure gauge assembly including a fitting for connection to the equipment being tested and a pressure gauge in communication with the fitting for registering the pressure in the equipment, and valve means for isolating the gauge and the fitting from the supply means.

Patented May 4, 1971  3,577,768

INVENTORS
THEOPHIL APRILL, JR.
JOHN R. LEERKAMP
BY
*Olsen and Stephenson*
ATTORNEYS

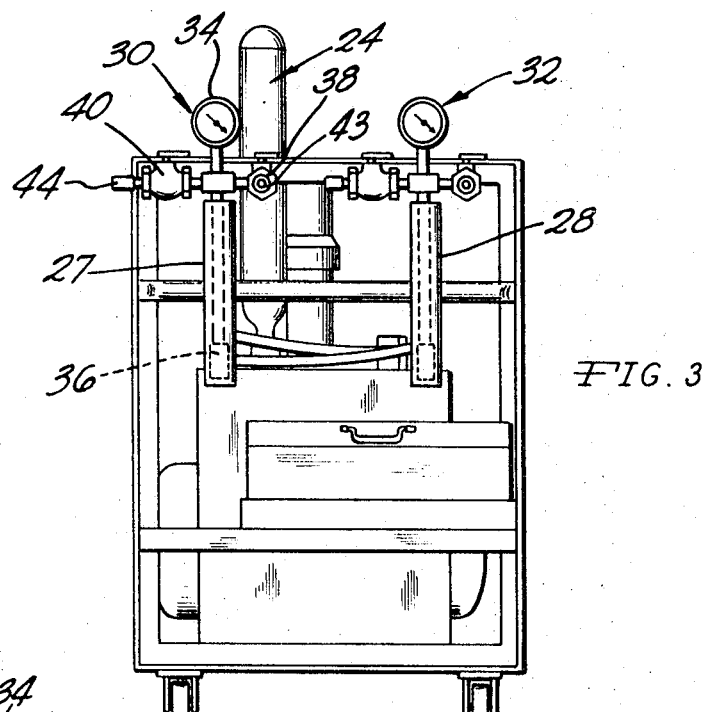
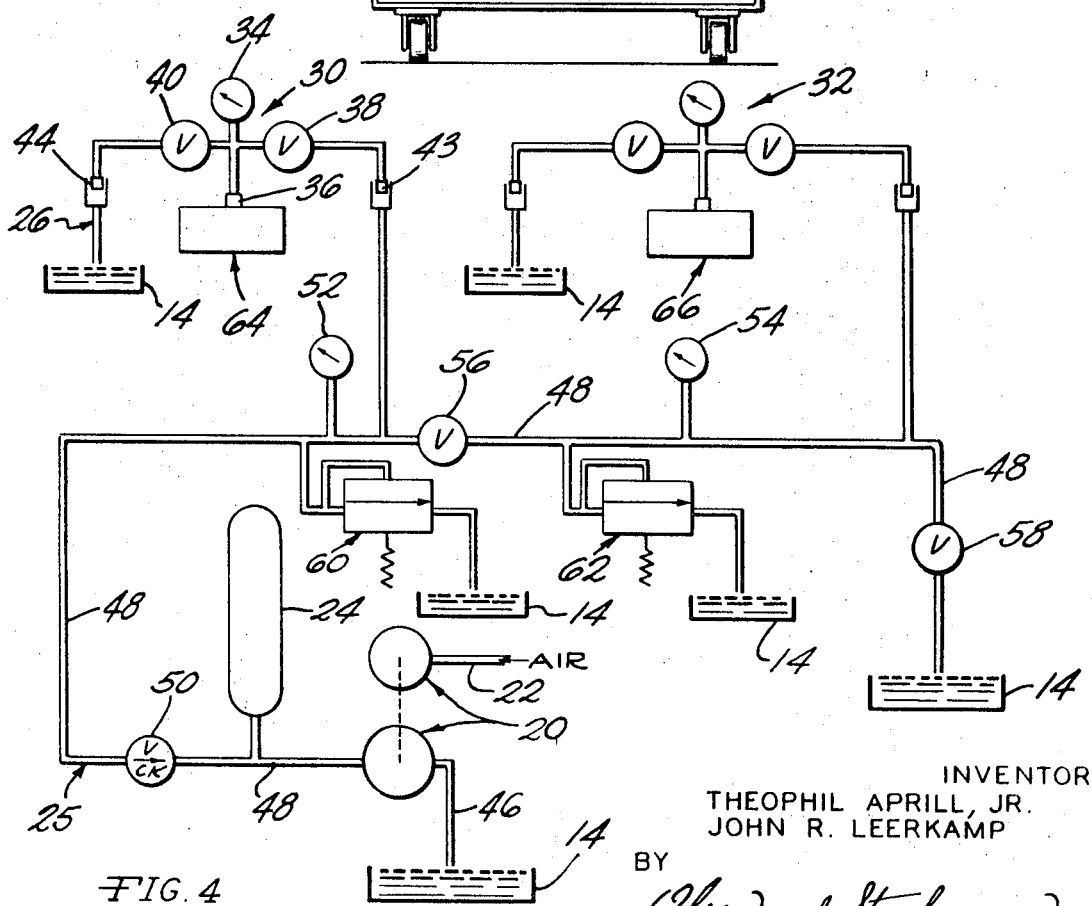

3,577,768

HYDROSTATIC TESTING APPARATUS

BACKGROUND OF THE INVENTION

The present invention relates to hydrostatic testing apparatus, and more particularly to portable apparatus of this character which is constructed and arranged to permit testing of a variety of hydraulic equipment or systems.

It is normally accepted by manufacturers of hydraulic equipment that their equipment is safe for operation if it will withstand 1 ½ times its rated operating pressure. This general rule applies to new as well as used hydraulic equipment. However, portable testing equipment that can be moved readily to the site of installations of such hydraulic equipment is not readily available, especially testing equipment that can be adapted to test a variety of different types of hydraulic systems of varying capacity. Thus, it is often desirable to test for safety standards lifts in automobile service stations which can be either an electric-hydraulic lift or an air-over-oil lift, and at the present time suitable equipment for conducting such tests is not readily available.

SUMMARY OF THE INVENTION

The present invention is directed to portable hydrostatic testing apparatus which is particularly designed to overcome the shortcomings of the prior art and to provide a versatile unit which can be readily used for testing a variety of types of hydraulic systems of varying capacities.

According to one form of the present invention, a portable test apparatus is provided for detecting a leak in a hydraulic system including a mobile carriage on which the testing apparatus is mounted. The testing apparatus includes a reservoir for hydraulic fluid for use in carrying out the tests, a supply means for supplying hydraulic fluid under pressure from the reservoir to the apparatus being tested, such supply means including a hydraulic pump mounted on the carriage. A motor is operatively coupled to the hydraulic pump for driving the same. A pressure gauge assembly is provided having a fitting adapted to be connected to the system to be tested, and a pressure gauge in communication with the fitting for registering the pressure in the system when the fitting is connected. The supply means is coupled to said pressure gauge assembly for supplying the hydraulic fluid under pressure to the fitting. Return passage means are also coupled to the assembly for returning hydraulic fluid to the reservoir.

Means are provided in the pressure gauge assembly so that after the supply means has been used to introduce hydraulic fluid under a desired pressure into the hydraulic system being tested, valve means can be closed to isolate the pressure gauge and its associated fitting from the rest of the test apparatus thereby to permit the pressure within the hydraulic system being tested to be indicated by the pressure gauge for a time period sufficient to indicate whether leakage occurs in the hydraulic system being tested.

The portable testing apparatus may include a plurality of such pressure gauge assemblies, each provided with quick-disconnect coupling for connecting and disconnecting the assembly to and from an associated branch of the supply and return passage means, whereby a plurality of similar hydraulic systems can be tested, or if desired, the apparatus can be used to test different types of hydraulic systems, such as electric-hydraulic lifts or air-over-oil lifts which have different rated operating pressures. When testing different systems of different ratings, it is merely necessary that the pressure gauges and relief valves associated therewith be set to function at the test pressure that is required for the system to be tested.

Accordingly, it is an object of the present invention to provide improved test apparatus for testing hydraulic systems.

Other objects of this invention will appear in the following description and appended claims, reference being had to the accompanying drawings forming a part of this specification wherein like reference characters designate corresponding parts in the several views.

BRIEF DESCRIPTION OF THE DRAWING

FIG. 3 is an end elevational view of the test apparatus, showing pressure gauge assemblies disconnected from the system and supported in support racks designed for this purpose; and FIG. 4 is a schematic diagram of the hydraulic circuits of the portable test apparatus.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
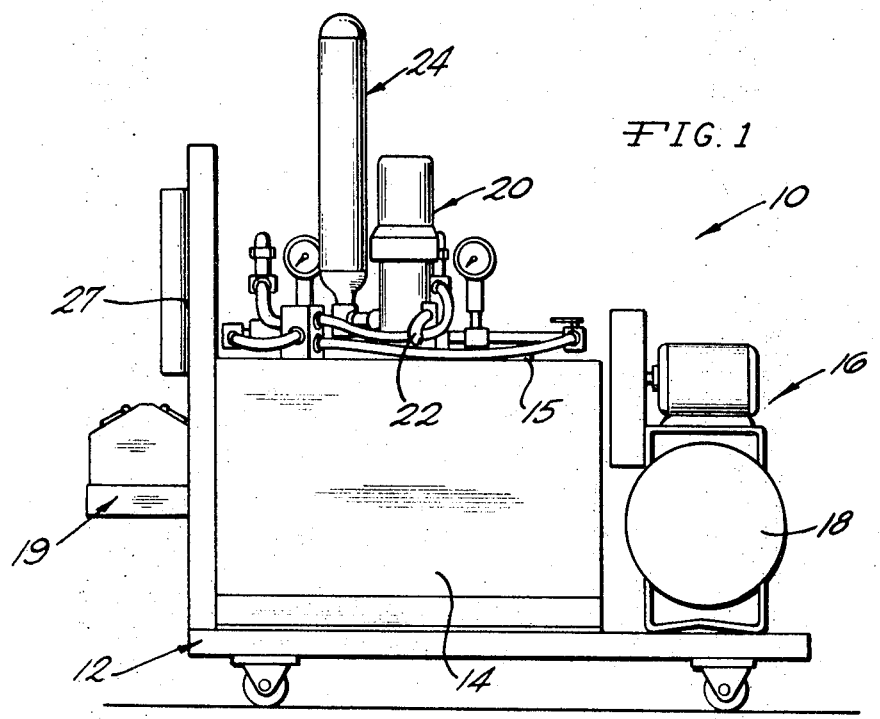
FIG. 1 is a side elevational view of a portable test apparatus embodying one form of the present invention.
Figure 2:
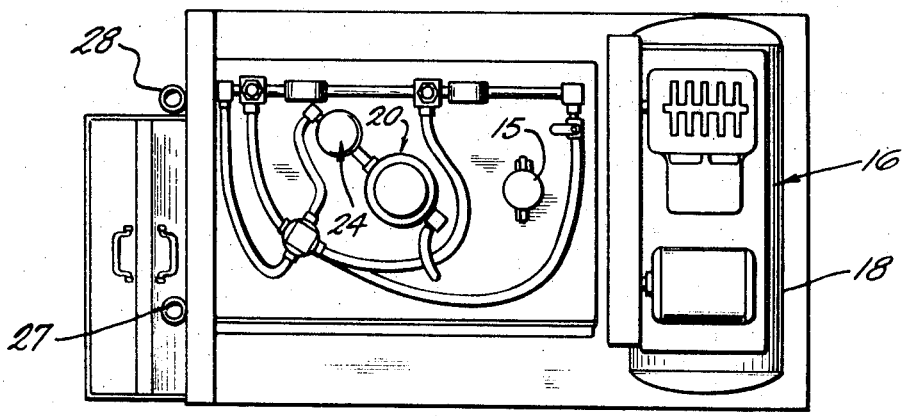
FIG. 2 is a top plan view of the portable test apparatus.

Referring now to the drawings, the invention will be described in greater detail. As shown in FIGS. 1—3, a portable test apparatus 10 is provided having a mobile carriage 12 on which is mounted a reservoir 14 for hydraulic fluid which can be introduced through the fill cap 15. The capacity of the reservoir may vary, but preferably it will have a capacity of approximately 60 gallons. Mounted on the carriage 12 adjacent to the reservoir 14 is an air compressor unit 16 having a tank 18 for storing compressed air. A suitable tool box 19 may also be supported on the carriage 12.

Mounted on the reservoir 14 is a hydraulic pump and associated air motor 20 that is adapted to be driven by compressed air received from the tank 18 via the air hose 22, FIG. 4. Also mounted on the reservoir 14 is the surge tank 24 and other portions of a supply means 25 for supplying hydraulic fluid under pressure to the system to be tested, and a return passage means 26. These supply and return passage means 25 and 26 will be described in greater detail hereafter with respect to the schematic diagram illustrated in FIG. 4.

At one end of the carriage 12 are two support racks 27 and 28, each being adapted to support a separate pressure gauge assembly 30 and 32, as can be seen in FIG. 3. Only one pressure gauge assembly will be described, reference being made to pressure gauge assembly 30. The latter includes a pressure gauge 34 which is in communication with a fitting 36 which can be any suitable type adapted to be connected to a corresponding part of the hydraulic system that is to be tested. On opposite sides of the passageway extending between the fitting 36 and its pressure gauge 34 are conventional stop or ball valves 38 and 40, and at the outer extremities of the passageways containing the valves 38 and 40 are the quick disconnect couplings 43 and 44.

Referring now to FIG. 4, the hydraulic circuit of the testing apparatus will be described. As there shown, the hydraulic pump and air motor 20 are arranged with the suction side of the pump in communication with the reservoir 14 by means of the conduit 46 and the discharge side of the hydraulic pump is in communication with the conduit 48, which if all valves along the main branch are in an open position will discharge back to the reservoir 14. The surge tank 24 is in direct communication with the conduit 48 to reduce or eliminate pulsations which may occur during the pumping operation so as to avoid damaging the pressure gauges and the like in the system. A check valve 50 is provided to prevent return flow and pressure gauges 52 and 54 are provided for indicating the pressure at different locations in the conduit 48. Suitable stop valves, such as ball valves are provided at 56 and 58, the latter being provided so that it can be closed when it is desired to carry on the testing operation, through the pressure gauge assembly 32, and the former being provided so that it can be closed when it is desired to perform tests using the pressure gauge assembly 30. An adjustable relief valve 60 is provided upstream from the valve 56 for use when tests are being conducted through the pressure gauge assembly 30, and a second adjustable relief valve 62 is provided downstream from the valve 56 for use when tests are being conducted through the pressure gauge assembly 32.

Normally, the second pressure relief valve 62 will be set to open at a lower pressure than the first pressure relief valve 60. With this arrangement, electric-hydraulic lifts having, for example, a pressure rating of 200 p.s.i. can be tested through the pressure gauge assembly 30 merely by closing valve 56 and having the relief valve 60 set to open at 350 p.s.i. This arrangement will allow the electric-hydraulic lifts to be tested at 1½ times its pressure rating of 200 p.s.i. or at 300 p.s.i.

The second pressure relief valve 62 can be set to open at 260 f.s.i., for example, and then with the stop valve 56 in an open position and stop valve 58 in a closed position, the pressure gauge assembly 32 can be used for testing conventional air-over-oil lifts which have a lower pressure rating than conventional electric-hydraulic lifts.

In operation, assuming that an electric-hydraulic lift is to be tested, the valve 56 will be closed and the pressure gauge assembly 30 will be connected to a suitable fitting in the hydraulic system of the lift, indicated generally by the reference number 64. Normally, the connection will be made to a fitting which is part of or is in communication with the reservoir of the system to be tested.

After the fitting 36 has been connected to the appropriate fitting of the system 64, the quick-disconnect couplings 43 and 44 are connected to the supply and return means 25 and 26. The complete sequence of steps used to test a specific hydraulic system or lift will not be given in detail, because the sequence of steps followed will necessarily vary when different types of systems are being tested. However, it is to be understood that when the pressure gauge assembly 30 is connected to the system 64, hydraulic fluid under a selected pressure can be supplied from the test apparatus 10 to the system 64 via supply means 25, open valve 38 and fitting 36. For this purpose valve 40 will be closed. Thereafter, when the pressure in system 64 has reached the desired magnitude, such as 300 p.s.i., for example, the valve 38 can be closed, thereby isolating the pressure gauge 34 and the fitting 36 from the supply and return means 25 and 26 while allowing the pressure gauge to register the pressure in system 64. If the system 64 will then hold the pressure within prescribed limits, such as 10 p.s.i., for a time period, such as 30 minutes, the system 64 will pass the test. Failure of the system 64 to meet the test standard will require additional test procedures to be followed to locate the site of the leakage. When the test is completed, the hydraulic fluid supplied from the test apparatus 10 can be returned by opening valve 40.

It is to be noted that, if desired, the pressure gauge assembly 30 can be disconnected from the remainder of the test apparatus 10 while the timed testing is occurring, because the closed valves 38 and 40 will allow the quick-disconnect couplings to be disconnected from the remainder of the test apparatus while pressure within the system 64 will continue to be registered by the pressure gauge 34. Thus, if desired, a second system, similar to system 64 can then be tested using a second test gauge assembly corresponding to the assembly 30.

If it is desired to conduct a test of a different hydraulic system 66, which may be, for example, an air-over-oil lift, the valve 56 can be opened and valve 58 closed, and the same general procedure can be followed as indicated above, but a lower test pressure will be applied through the pressure gauge assembly 32.

We claim:

1. Test apparatus for detecting a leak in a hydraulic system comprising a reservoir for hydraulic fluid, a fitting adapted to be connected to said hydraulic system, a pressure gauge mounted in communication with said fitting for registering the pressure in said system when the fitting is so connected, supply means for supplying hydraulic fluid under pressure from said reservoir to said fitting, and return means for returning to said reservoir hydraulic fluid supplied by said supply means, and valve means for isolating said gauge and said fitting from said supply means and said return means.

2. Test apparatus as is defined in claim 1, wherein a pressure gauge assembly is releasably connected in series between said supply means and said return means, said assembly including said fitting, said pressure gauge and said valve means.

3. Test apparatus as is defined in claim 2, wherein said valve means include valves in said gauge assembly adjacent to the locations of connection of the gauge assembly with said supply means and said return means.

4. Test apparatus as is defined in claim 2, wherein said pressure gauge assembly is releasably connected to said supply means and said return means by quick-disconnect couplings.

5. Test apparatus as is defined in claim 2, wherein a second pressure gauge assembly is releasably connected in series between said supply means and said return means, said second pressure gauge assembly being in parallel with the first-named pressure gauge assembly.

6. Test apparatus as is defined in claim 5, wherein said supply means includes valve means for selectively placing either of said pressure gauge assemblies operably in series with said supply means.

7. Test apparatus as is defined in claim 6, wherein a first pressure relief valve is in said supply means for limiting the pressure of hydraulic fluid that can be supplied to the fitting of said first-named pressure gauge assembly, and a second pressure relief valve is in said supply means for limiting the pressure of hydraulic fluid to a lower magnitude that can be supplied to the fitting of said second pressure gauge assembly.

8. Test apparatus as is defined in claim 7, wherein said supply means includes an hydraulic pump and means for substantially eliminating pulsations from the hydraulic fluid delivered under pressure to either of said pressure gauge assemblies.

9. Test apparatus as is defined in claim 8, wherein an air motor is coupled to said hydraulic pump for driving the latter.

10. Test apparatus as is defined in claim 9, which includes a mobile carriage on which the remainder of the test apparatus is mounted.

11. Portable test apparatus for detecting a leak in a hydraulic system comprising a mobile carriage on which is mounted a reservoir for hydraulic fluid, a hydraulic pump, a motor operatively coupled to said hydraulic pump, a first pressure gauge assembly having a fitting adapted to be connected to said system and a pressure gauge in communication with said fitting for registering the pressure in said system when the fitting is so connected, supply passage means coupled to said assembly and including said hydraulic pump for supplying hydraulic fluid under pressure to said fitting, return passage means coupled to said assembly for returning hydraulic fluid to said reservoir, and valve means for isolating said gauge and said fitting from said supply passage means and said return passage means.

12. Portable test apparatus as is defined in claim 11, wherein a second pressure gauge assembly is coupled to said supply and return passage means in parallel to said first pressure gauge assembly.

13. Portable test apparatus as is defined in claim 12, wherein quick-disconnect couplings connect each of said pressure gauge assemblies to its associated supply and return passage means.

14. Portable test apparatus for detecting a leak in a hydraulic system comprising a mobile carriage on which is mounted a reservoir for hydraulic fluid, a hydraulic pump, a motor operatively coupled to said hydraulic pump, a first pressure gauge assembly having a fitting adapted to be connected to said system and a pressure gauge in communication with said fitting for registering the pressure in said system when the fitting is so connected, supply passage means coupled to said assembly and including said hydraulic pump for supplying hydraulic fluid under pressure to said fitting, return passage means coupled to said assembly for returning hydraulic fluid to said reservoir, a second pressure gauge assembly coupled to said supply and return passage means in parallel to said first pressure gauge assembly, quick-disconnect couplings connecting each of said pressure gauge assemblies to its associated supply and return passage means, pressure relief valves positioned in said supply passage means adjacent to each of said pressure gauge assemblies, said second pressure gauge assembly and its associated relief valve being downstream from the fist pressure gauge assembly and its associated relief valve, the second relief valve being operable to limit the fluid pressure to a lower pressure than the first relief valve, and valve means for closing the supply passage means in advance of said second relief valve.